Dec. 31, 1963  J. E. BLYTHE ETAL  3,115,731
APPARATUS AND METHOD FOR AUTOMATICALLY WRAPPING AND SEALING
ARTICLES IN THERMOPLASTIC OVERWRAP FILM MATERIAL
Filed June 18, 1959
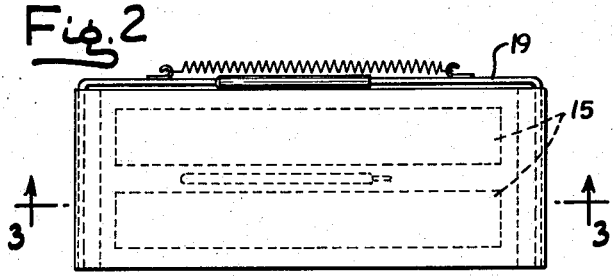
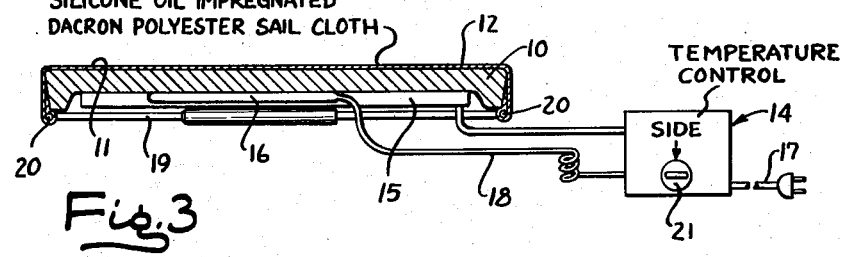
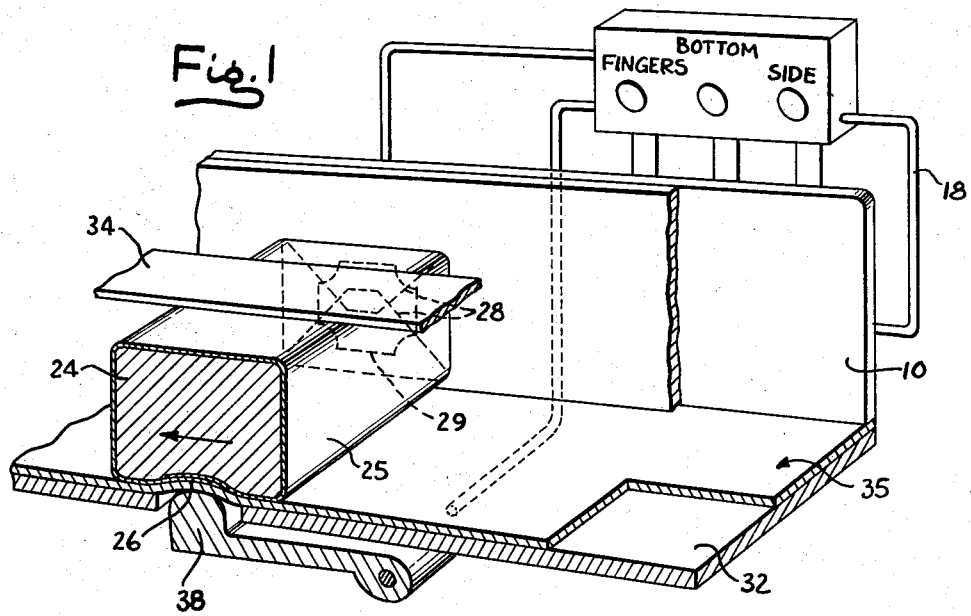
INVENTORS
JAMES E. BLYTHE
BY PHILIP E. PRINCE
Wolfe, Hubbard, Voit + Osann
ATTYS.

United States Patent Office 3,115,731
Patented Dec. 31, 1963

3,115,731
APPARATUS AND METHOD FOR AUTOMATICALLY WRAPPING AND SEALING ARTICLES IN THERMOPLASTIC OVERWRAP FILM MATERIAL
James E. Blythe and Philip E. Prince, Rochester, N.Y., assignors to National Distillers and Chemical Corporation, a corporation of Virginia
Filed June 18, 1959, Ser. No. 821,288
2 Claims. (Cl. 53—33)

The present invention relates to automatic packaging machines and more particularly to automatic machinery for wrapping articles such as bread in overwrap film materials and sealing the materials over the article to form a completed package.

Automatic packaging machines for wrapping articles, such as bread, in overwrap film materials of the nature of cellophane having an adhesive coating thereon have been widely used for many years. In these machines the article is automatically wrapped in a loop of cellophane and the ends are folded together as flaps to form a seal. During the wrapping and folding of the flaps sufficient heat is applied to activate the adhesive on the flaps and thereby seal them together. This is conventionally done by passing the wrapped article between heated platens which both fold the end flaps and activate the adhesive coating on the cellophane so that as the flaps are folded together each layer adheres to the other and a seal is formed. To cover the folded end flaps and provide an attractive package, labels are conventionally applied to the ends of the bread loaves. These labels, too, are heat activated and are sealed to the package by passing the ends of the package between heated platens. This procedure is successful with cellophane, which, being a nonthermoplastic material is not affected by the heat used to activate the adhesive and form a seal.

Attempts have been made to utilize polyethylene and other similar thermoplastic materials in such wrapping apparatus. Considerable problems are involved, however, because polyethylene, being a thermoplastic material, fuses and will not slide across heated metal platens. These problems have been overcome to some extent by interposing between the polyethylene and heated platens a continuous belt of polytetrafluoroethylene or "Teflon," against which the polyethylene rests, and the belt and polyethylene are slid across the heated platens. The use of belts made of "Teflon," while enabling polyethylene film to be used in automatic packaging machinery involves considerable modification and rebuilding of existing machines, with the attendant expense of any substantial modification. Alternatively, the use of coated or treated polyethylene film has achieved some success on existing wrapping machines. As a result, the many existing packaging and film wrapping machines have been obsoleted as far as the use of untreated polyethylene overwrap film is concerned.

It is the principal object of the present invention to provide a new and improved method and apparatus for automatically wrapping articles such as bread in overwrap film material of thermoplastic character such as polyethylene. More specifically, it is an object of the invention to wrap articles such as bread in thermoplastic film such as polyethylene, polypropylene, and like polyolefin film materials, using conventional existing cellophane type wrapping machines in which a label having a suitable adhesive thereon is applied to the folded and overlapping edges of the overwrap material and then passed across a heated platen to effect an end seal of the package.

Another object of the present invention is to provide a method for sealing articles wrapped in thermoplastic overwrap film by sliding the wrapped article relative to a heated platen which engages overlapped marginal film edges and which is maintained at a temperature sufficient to fuse the film without destroying it.

A further object of the invention is to provide an apparatus for use on conventional wrapping machines of the type now used for cellophane and waxed paper so that such machines can seal a package wrapped in a thermoplastic overwrap film. It is a related object of the invention to provide means for modifying conventional cellophane and waxed paper film type machines for use with polyethylene and like thermoplastic overwrap films.

Other objects and advantages of the present invention will become apparent as the following description proceeds taken in connection with the accompanying drawings wherein:

FIGURE 1 is a schematic fragmentary perspective view of a loaf of bread wrapped in thermoplastic film being sealed in a unit illustrative of the present invention.

FIG. 2 is an elevation view of a sealing element useful in the unit shown in FIG. 1.

FIG. 3 is a section view of the element shown in FIG. 2 taken substantially in the plane of line 3—3 thereon and including a temperature control device.

While a certain illustrative embodiment of the present invention has been shown in the drawings and will be described below in considerable detail, there is no intention to limit the invention to the specific form disclosed. On the contrary, it should be understood that other modifications and alternative constructions can be employed which fall within the spirit and scope of the invention as defined in the appended claims.

Conventional wrapping machines for wrapping loaves of bread in cellophane or waxed paper are of varied types and have been used for many years. Illustrative of these machines is the "Super Standard" wrapping Machine manufactured by American Machine and Foundry Company (A.M.F.). Machines of this type receive the overwrap film in the form of roll stock from which film is withdrawn and passes through the wrapping mechanism. A loop of the film is formed around a loaf of bread inserted in the machine and the film is severed from the roll stock. The film provides an overlapping marginal edge portion along the bottom of the loaf and sufficient side edge portions to form end flaps on the loaf. During the initial wrapping operation, the loaf of bread is covered with the loop of overwrap film material and is inserted between a pair of spaced tucker arms which make the first end fold. As the arms and bread are raised the second end folds are made as the bread is raised through an opening in the table. From this point, a paddle on a conveyor engages the bread and pushes it forward towards the sealing mechanism thereby making the third fold. The fourth fold is made by a plow arrangement which lifts the extending bottom flaps on the ends. All of the foregoing is well known in the art and requires no further explanation. Various parts of the folding mechanism may be heated so that the ends of the loaf are sufficiently heated to form a seal or receive a label.

Because polyethylene and like films collect a considerable amount of static electricity on their surface as they pass through the wrapping mechanism, it is desirable to locate a suitable static eliminator between the roll supply of the wrapping film and the wrapping mechanism. Any suitable device may be employed, such as the device shown in U.S. Patent 2,449,972, which is formed of a bar having a plurality of brass brushes extending therefrom. The bar is positioned transversely to the film with the brushes about ½" therefrom, and the brushes are grounded by a connection to the machine frame.

For some wrapping operations, the end flaps of the overwrap material are sealed and paper labels are applied to the ends of each loaf in order to cover the end flaps. However, when wrapping articles in polyethylene it is desirable not to seal the overlapping end flaps to one another but to use the label for sealing so that the label and not the wrapper is torn when the package is opened. In this way, the package ends are not torn and may be folded together to keep the wrapped article fresh. The labels are applied by any suitable labeling mechanism which may include a label source and a plunger. When labels are to be used for sealing, they are coated on one side with a heat activatable adhesive which will stick securely to polyethylene, and which, when engaged with the hot ends of the loaf, are activated so that the labels stick to the wrapper. One illustrative label applying machine is shown in U.S. Patent 2,349,317, the disclosure of which is herein incorporated by reference.

The wrapped loaves pass through a sealing station on the machine where labels are applied and sealed to the end flaps and the bottom seam of each loaf is sealed. At this station, the loaves pass between spaced heating elements which engage and seal the label to the end flaps, and over a bottom heating element which seals the bottom seam. It is with the side sealing and bottom sealing heating elements of the sealing station with which the present invention is primarily concerned. It will be appreciated that when labels are used for sealing, the overlapping flaps are not sealed together but the label is used to effect a closure seal. However, it may be desirable for some applications to seal the overlapping end edges together without using a label.

It will be appreciated that in machines of the above type, the bread is slid forwardly through the machine and comes into sliding contact with the heating elements. When cellophane and waxed paper are being sealed, metal surfaced heating elements which are heated to a sufficiently high temperature to effect a seal can be employed.

It has heretofore been impossible, however to employ machines which are constructed to seal cellophane and other nonthermoplastic materials for sealing polyethylene or like thermoplastic overwrap film materials without coating or otherwise specially treating the polyethylene film.

In accordance with the present invention, a metal heating plate 10 (FIG. 3) of the type conventionally used for sealing cellophane, having a metal surface 11 which may be smooth or have grooves lying in the direction of travel of the articles to be sealed, has been adapted for use with polyethylene overwrap film materials by the application thereto of a cover 12 which has a low sliding resistance with respect to hot polyethylene film. Also, as a part of the invention, the heating plate 10 is provided with a temperature controlling means 14 such as a variable thermostatic switch for purposes of regulating the temperature to precisely the degree needed for sealing the polyethylene without destroying the film.

More specifically, the heating device 10 shown in FIG. 3 of the drawing is in the form of a plate having appropriate electric resistance heating elements 15 attached to the rear surface thereof. The heating elements 15 are energized, through the electrical control 14, from any suitable source of electricity, to which the elements and control are connected by a suitable line 17. For controlling the temperature of the sealing plate there is desirably affixed thereto means for sensing the surface temperature of the plate, such as a heat sensitive bulb 16 of a capillary tube 18 forming a part of the thermostat control unit. Other temperature sensing means, such as a thermocouple, may be used provided that they are sufficiently sensitive over the temperature range to be employed.

In order to provide the heated element with a surface which will not stick when slid relative to the hot polyethylene, the present invention contemplates covering the plate with a fabric or other material 12 impregnated with silicone oil. The fabric must be long wearing, and capable of absorbing sufficient silicone oil to present a surface which will slide readily relative to the hot film, and which will transmit sufficient heat to effectively seal the film.

We have found that 4 oz. weight sail cloth woven of "Dacron" polyester fibre, is admirably suited both from a wear standpoint and from the standpoint of minimum resistance to sliding of the polyethylene. This "Dacron" sail cloth, when impregnated with a silicone mold release oil and placed on the heating element affords an excellent slip promoting surface for the polyethylene film. The "Dacron" sail cloth is preferably bound at the edges and is wrapped around the plate and held thereto by a U-shaped spring clip 19 inserted through appropriate loops 20 in opposite hems of the cloth. Any other type of attaching means can, of course, be employed and generally the method of attaching the silicone impregnated covering 12 to the sealing plate 10 will depend upon the shape and position of the plate.

As described in copending application, Serial No. 808,441, filed April 23, 1959, now abandoned, the silicone impregnated "Dacron" sail cloth is believed to substantially reduce the sliding resistance to polyethylene at the temperatures required to seal the label to the end flaps and to seal the bottom overlapping edges so that articles wrapped in such polyethylene can readily slide when in contact with the heated sealing plate.

Silicone oils of the type useful are described in the above mentioned copending application. Briefly, the oils are believed to be nonvolatile, silicone oils such as the trimethylsilyl end blocked polymethylsiloxanes having a flash point above the surface temperature of the heating element. One silicone oil which has been found to be useful is a mold release agent sold under the name of "I.M.S. Silicone Spray-Mold Release" by the Injection Molders Supply Company and believed to be Dow Corning No. 200 silicone oil, a product of the Dow Corning Corporation and a silicone oil of the above type having a viscosity of 350 centistokes, specific gravity of 0.972 at 72° F., a viscosity temperature coefficient of 0.62 (vis. 210° F./100° F.).

It is also important to control the temperature of the heating element so that it is maintained at about 300° F. and preferably within the range of 275° F. to 345° F. depending upon the density of the polyethylene being sealed. We have found that the sealing temperature required depends upon the length of time of contact between the wrapped package end flaps and the heated sealing platen and the characteristics of the label adhesive employed. The temperature to be employed will, of course, vary with the type of machine and can be readily determined by one skilled in the art knowing the rate at which wrapped articles move through the machine.

On the A.M.F. "Super Standard" machine described above, the time of contact between the bread and the end and bottom sealing plates is about 3 to 5 seconds. The sealing pressure applied must also be sufficient to hold the bottom flaps together while they are fused, and to hold the label against the side flaps while it is fused to them. With bread, the pressure is usually sufficient to slightly compress the loaf, but not enough to interfere with the movement of the bread through the machine.

To this end, the thermostat control 14 is provided with a switch knob 21 for the purpose of setting the desired temperature to be maintained. The thermostat may be of any appropriate design which will afford a controllable sealing plate temperature in the range required to effect a seal. One thermostat control which has been successfully used is a double pole snap action switch adjustable to various temperature settings and actuated by a diaphragm assembly which is connected by a capillary tube to a heat sensitive bulb, and is sold by The Wilcolator Company as Model G4. These thermostats are capable of controlling the plate temperatures to within ±5° F.

A loaf of bread, wrapped in polyethylene film overwrap material, is sealed therein by passing the loaf between side plates and over a bottom plate of the character described above. This is illustrated diagrammatically in FIG. 1. The bread 24 there shown is wrapped in polyethylene film overwrap material 25 in the usual manner to form overlapping edges 26 on the bottom of the loaf and unfolded end flaps 28 on each end of the loaf. The end flaps are initially heated during the folding operation so that when a label 29 is applied it will adhere sufficiently and will be carried by the load to the sealing station.

In order to seal the bread in the film, it is pushed between side sealing plates 10 and over a bottom sealing plate 32, all of which are heated to the sealing temperature. As the bread is pushed between the sealing plates by a conveyor (not shown) it is held against the bottom plate by an overarm 34 mounted on the machine frame.

In accordance with our invention, each of the side sealing plates 10 is covered with a silicone oil impregnated "Dacron" sail cloth covering 12 as described above and the temperature of each is carefully regulated by a thermostat temperature control (not shown in FIG. 3) connection to respective ones of the heating elements on the side and bottom plates.

The ends of the load slide easily across the covered side sealing plates and the label is quickly sealed to the end flaps without tearing the film. The flaps themselves are not sealed together so that the package is securely sealed by the label yet can be opened quite easily without tearing the wrapper itself.

In order to form a sealed bottom seam along the loaf with the overlapping edges 26 being fused together, the bottom plate 32 is also heated. As described above, in connection with the side plates, the bottom plate 32 is covered with a silicon impregnated "Dacron" sail cloth covering 35. This covering is simply a strip of the material which is stiffened along a leading edge to form a hook portion (not shown) which engages around the leading edge of the bottom plate.

The cloth simply lies over the bottom plate, no additional support or holding device being needed.

For completing the bottom seam so as to be sure a tight seal is formed, the above A.M.F. machine employs a plurality of heated fingers 38 recessed in the bottom plate and raisable into contact with the bottom of a loaf of bread. The bread pauses over the fingers 38 which are raised into momentary contact with the overlapping bottom edges 26. The bottom covering 35 covers the fingers as well so that they do not stick to the polyethylene film wrapper. As with the bottom and side sealing plates, the temperature of the fingers is desirably controlled by a thermostat of the type described above. In general, for intermediate density polyethylene, the side and bottom heating plates are maintained at a temperature between about 275° and 300° F., while the fingers are maintained slightly hotter, preferably between about 300° F. and 325° F. This is desirable because the fingers make only momentary contact, while the bottom and side plates are in sliding contact with the bread over a longer period of time.

Using an A.M.F. cellophane type wrapping machine, equipped with a static eliminator and having the various side heating elements, the bottom and finger heating elements and the label plunger covered with 4 oz. "Dacron" sail cloth impregnated with silicone oil, and with the temperature of the heating elements controlled to between 275° F. and 300° F., and the bottom fingers to between 300° F. and 325° F., we were able to wrap freshly baked bread in polyethylene film. We employed film having a density of 0.935 and a thickness of between 1.1 and 1.25 mils, extruded from intermediate density (0.935) polyethylene resin identified as "Tenite" 1001F, a product of Tennessee Eastman Co. The machine was operated at a speed of from 42 loaves per minute to 55 loaves per minute. Excellent wrappings and seals were obtained with the end flaps being held tightly closed together by the labels.

We claim as our invention:

1. In the method of automatically wrapping articles in thermoplastic overwrap film material such as polyethylene wherein a sheet of thermoplastic film material is folded around an article so as to form overlapping marginal film edges and the articel wrapped in polyethylene film is transported relative to a heated plate with said overlapping film edges in sliding contact with a surface of said plate, the steps comprising covering the control surface of said heated plate with a polyester fabric impregnated with silicone oil so that said impregnated fabric has a sliding resistance with respect to said polyethylene which is less than that resistance which will cause the film to tear at the sealing temperature, and maintaining said covered surface at a sealing temperature sufficient to fuse said overlapping film edges together when the article is moved relative to said plate in sliding contact therewith.

2. Sealing means for use in a mechanism for automatically wrapping articles in thermoplastic overwrap film to seal together overlapping marginal film edges, said sealing means comprising, in combination, heated plates each having a surface for contacting and sealing together overlapping film edges of the overwrap material as the wrapped article proceeds through the machine, said heated plates presenting sealing surfaces slidingly engageable by said wrapped article, means for controlling the temperature of said heated plate surfaces to a temperature which is sufficient to fuse together the overlapping edges of the film without destroying the film, means including a temperature resistant woven polyester fabric impregnated with a silicone oil covering said plate surfaces and presenting a film contacting surface which has a sliding resistance to the thermoplastic film at the sealing temperature which is less than that resistance which will cause the fused film to tear, and means removably mounting said covering means on said heated plates.

References Cited in the file of this patent
UNITED STATES PATENTS

| | | |
|---|---|---|
| 2,421,373 | Cozza | June 3, 1947 |
| 2,609,316 | Fichtner | Sept. 2, 1952 |
| 2,679,194 | Ehrenfried et al. | May 25, 1954 |
| 2,682,294 | Langer | June 29, 1954 |
| 2,703,133 | Payton | Mar. 1, 1955 |
| 2,714,416 | Fener | Aug. 2, 1955 |
| 2,727,345 | Schoppee | Dec. 20, 1955 |